March 23, 1971     L. D. BEARD ET AL     3,572,327

UNIVERSAL TRACTION BELT MEANS

Filed July 3, 1968

INVENTORS
LEANDER D. BEARD
ROBERT J. BOGGS
JOHN R. TREACE

BY John R. Walker, III
Attorney

United States Patent Office 3,572,327
Patented Mar. 23, 1971

3,572,327
UNIVERSAL TRACTION BELT MEANS
Leander D. Beard and Robert J. Boggs, Memphis, and John R. Treace, Germantown, Tenn., assignors to Richards Manufacturing Company, Memphis, Tenn.
Filed July 3, 1968, Ser. No. 742,278
Int. Cl. A61h 1/02
U.S. Cl. 128—75                                       3 Claims

ABSTRACT OF THE DISCLOSURE

Pelvic traction belt means is disclosed which is adapted for use with existing traction weight means. The traction belt means includes a belt body having "Velcro"-type fastening means for fastening the belt body about the waist of a patient and includes bridle means adapted for interconnecting the belt body and the existing weight means. The bridle means has at least one U-shaped strap-like yoke member having a pair of end portions adapted to be detachably engaged by "Velcro"-type fastening means to the belt body. A series of gather-like loops are arranged along the lower outside portion of said belt body and a selected pair of the loops are adapted to receive the opposite end portions of the U-shaped yoke member as the yoke member end portions are being supported by a "Velcro"-type fastening means on the belt body. The belt body is provided with resiliently stiff stay members arranged in the body and provides reinforcing means for reinforcing the flexible movement of the belt body. A selected pair of loops embracing the opposite end portions of the yoke member and the reinforcing means of the belt body are simultaneously coactingly operative for preventing peeling disengagement of the "Velcro" fastening means and disengagement of the yoke from the belt body.

BACKGROUND OF THE INVENTION

(1) Field of the invention

The invention pertains to orthopedic or traction appliances generally and particularly to traction belt means adapted for use with traction weight means.

(2) Description of the prior art

Traction belt means of prior art design typically include a belt body adapted to be fastened about the waist of the patient and include yoke means secured along the lower edge of the belt body and such yoke means adapted for connection with traction strand means connected to a traction weight. Pat. No. 3,176,684 illustrates a pelvic traction belt of fairly recent design. Although slight variations in sizes of patients may be accommodated by the elastic material of the traction belt illustrated in Pat. No. 3,176,684, this belt will not accommodate a wide range of sizes of patients since the yoke means is fixed. Thus, if the yoke means were fixed or designed to accommodate a medium-sized person, the yoke means would not be positioned properly for a small or a large person and there would be no way to properly position the yoke means along the sides of the legs of the user.

The doctor or medical practitioner often desires to rearrange the pull points on a traction belt or to rearrange the yoke members to pull the traction belt body at desired places on the belt body. Many traction belt means such as the belt illustrated in Pat. No. 3,176,684 do not include means for laterally adjusting the pull points on the traction belt body. Moreover, in traction belt apparatus which do have means for locating the pull points on the belt body, such adjustment means typically are provided with clasps, buckles, sliding rings or the like. Buckles, clasps, rings or like hardware are generally uncomfortable to the patient and also such adjustment means may be painful to the patient during adjustment or fitting of the appliance to the patient.

SUMMARY OF THE INVENTION

The universal traction belt means of this invention utilizes "Velcro"-type fastening means for fastening the belt body together so that it will fit any size person and also utilizes "Velcro" fastening means for adjustably securing the yoke means at desired pull points on the belt body. The belt body, the "Velcro" fastening means, and yoke adjustment means of the invention are all formed of substantially soft pliable material and as such do not cause discomfort to the patient. Although of pliable construction, the yoke means of the invention is adjustable laterally along or about the lower edge of the belt body of the invention and provide a multiplicity of pull points for applying traction at desired places on the belt body. The medical practitioner may select a multiplicity of pull points and may quickly and easily apply the yoke means to the belt body in obtaining such pull points. Thus, regardless of the size of the person to which the belt means is attached, it can be fitted properly and the yoke means can be properly positioned.

DESCRIPTION OF THE PREFERRED EMBODIMENT

Figure 1:
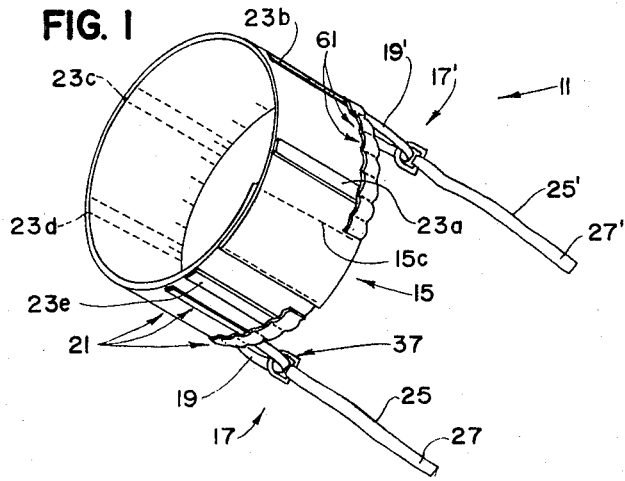
FIG. 1 is a perspective view of the traction belt means of the invention illustrated substantially in an assembled disposition with the belt body end portions secured together, and with the yoke means being secured on the belt body.

The pelvic traction belt apparatus of the invention is indicated by numeral 11 and basically includes a wide flexible belt body 13; first "Velcro"-type fastening means 15 adapted for detachably connecting longitudinally distant portions of the belt body together; bridle means including a pair of bridle assemblies 17, 17' including respectively yoke members 19, 19'; second fastening means 21 detachably fastening respectively yoke members 19, 19' on belt body 13; and reinforcing means including a plurality of stay assemblies 23a, 23b, 23c, 23d, 23e arranged intermittently along the length of the belt body. It should be pointed out that when the term "Velcro" is used herein it refers to that type of well known fastening means known as "Velcro," for example, like that shown in Pats. Nos. 2,717,437 and 3,154,837. Although in the normal use of the pelvic traction belt apparatus 11 of the present invention the patient will be in a supine position on a hospital bed with the traction weights being arranged to exert a pull on the traction belt in a direction towards the foot of the bed, as for example, as shown in Pat. No. 3,176,684, for purposes of clarity in description, the traction belt apparatus will be considered as being fitted about a standing patient; belt body 13 will be considered as being arranged generally horizontally and being in an encircled configuration about the waist of the patient. Moreover, pair of bridle assemblies 17, 17' will be considered as being arranged generally vertically and with traction strands 25, 25' extending vertically and with lower end portions 27, 27' thereof being firmly secured on typical traction weight pull member means (not shown).

Belt body 13 is formed from premium quality open cell plastic foam sheeting, as for example a polyurethane reticulated foam, and includes inward and outward sides 29, 31 and top and bottom edges 33, 35. First "Velcro"-type fastening means 15 includes first and second relatively operative contact surface elements 15', 15" arranged respectively on the outward and inward sides of the belt body.

Figure 3:
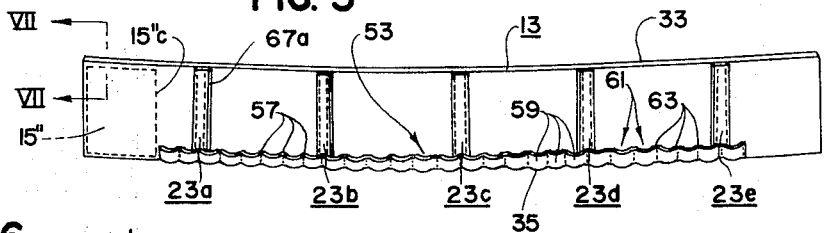
FIG. 3 is an outward side view of the belt body.

First "Velcro" contact element 15' is generally velvet-textured and formed substantially of micro-filament matted pile 15'a, firmly secured on fabric backing 15'b. Contact element 15' is adhesively secured or bonded on outward side 31 of belt body 13 on one end of the belt body (the righthand end as viewed in FIG. 3); fabric backing 15'b of "Velcro" contact element 15' is preferably adhesively secured to the belt body; however, in certain embodiments of the invention it may be desirable to sew or otherwise secure backing fabric 15'b on belt body 13.

Figure 7:
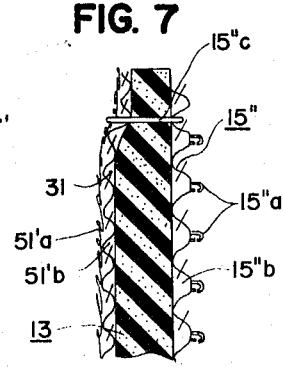
FIG. 7 is an enlarged sectional view of the belt body taken as on the line VII—VII of FIG. 3.
Figure 2:
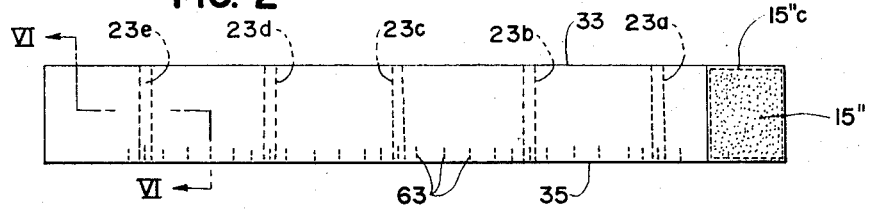
FIG. 2 is an inward side view of the belt body.

Second "Velcro" contact element 15" is generally bristle-textured and defined substantially by a multiplicity of short barbed bristles 15"a, secured on a fabric backing 15"b (see FIG. 7). "Velcro" contact element 15" is secured on the inward side of belt body 13 on that end portion of the belt body opposite from "Velcro" element 15'. Second contact element 15" is preferably sewn as by seam means 15'c passing around the periphery of element 15" and sewing fabric backing 15"b on belt body 13.

Figure 5:
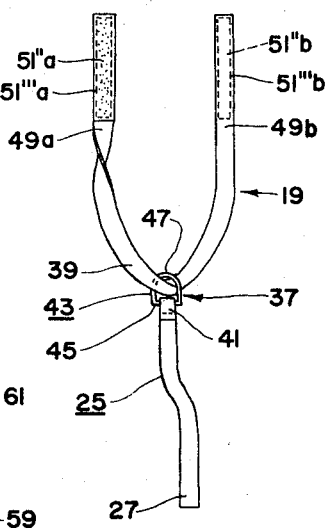
FIG. 5 is a view of the yoke means and showing also the bridle means of the invention.

Pair of bridle assemblies 17, 17' are alike and the following description of bridle assembly 17 will suffice also as a description of assembly 17':

Bridle assembly 17 includes, in addition to yoke member 19 and traction strand 25, equalizing link means 37 linking yoke member bight portion 39 with traction strand upper portion 41 (see FIG. 5). Equalizing link means 37 preferably includes a metal ring 43 having a flattened first portion 45 connected with traction strand upper portion 41, and having a second portion 47 loosely transversely embracing bight portion 39 of yoke 19. Second portion 47 of ring 43 is adapted to slidingly runningly engage the inward side surface of strap-like yoke member 19 and to equalize the tension respectively on yoke reach portions 49a, 49b. It will be understood that, if desired, adjustable fastening means, not shown, may be utilized to connect traction strand 25 and yoke bight portion 39, so that the effective length of strand 25 may be varied. For example, the adjustable fastening means, if desired, may be in the form of a so-called adjustable safety buckle, well known to those skilled in the art.

Second fastening means 21 is adapted to detachably fasten reach portions 49a, 49b at selective pull points on belt body 13. Second fastening means 21 substantially includes dual fastening means including (1) "Velcro"-type fastening means 51a, 51b and (2) fabric web shackle-like fastening means 53 (see FIG. 4). "Velcro"-type fastening means 51a, 51b and shackle means 53 are coactingly operative and provide means for releasably fastening reach portions 49a, 49b of yoke 19 at selected positions on the outward side of belt body 13.

Figure 6:
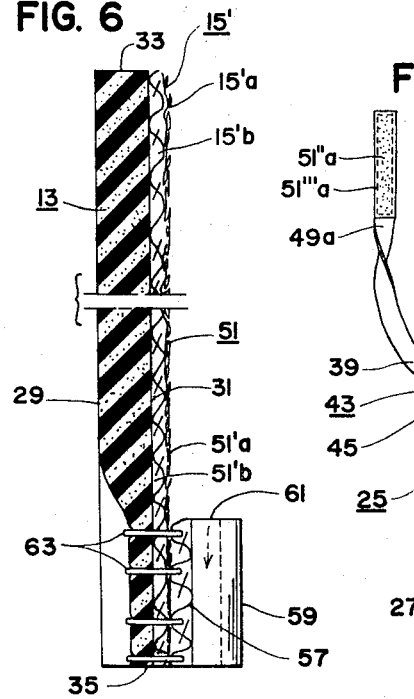
FIG. 6 is an enlarged sectional view of the belt body taken as on the line VI—VI of FIG. 2.

"Velcro"-type fastening means 51a, 51b includes a smooth first "Velcro" element 51 arranged on the outward side of belt body 13 and contact elements 51"a, 51"b secured respectively on reach portions 49a, 49b of yoke member 19. Velvet-textured first element 51 is preferably the same construction as first element 15' of fastening means 15 and in like manner includes a layer of micro-filament matted pile 51'a supported on a fabric backing 51'b which in turn is adhesively or otherwise secured on outward side 31 of plastic foam belt body 13 (see FIG. 6). Bristled "Velcro" elements 51"a, 51"b each are alike and are secured respectively in face to face engagement on bridle yoke reach portions 49a, 49b. Although not shown in detail, elements 51"a and 51"b each correspond substantially with belt fastening "Velcro" element 15" and in like manner are secured by seam means 51'''a, 51'''b on the terminal portions respectively of yoke reach portions 49a, 49b. First element 51 (the smooth or velvet-textured element of fastening means 21) preferably extends substantially over a major portion of outward side 31 of foam plastic belt body 13 and may if desired be formed continuous with "Velcro" element 15' of belt body fastening means 15. In this way the size of the belt may be adjusted from an infant size to an adult size so that the belt has a "universal" fit.

Fabric web shackle means 53 includes a fabric web 55 laminatingly secured at intermittently spaced attachment places or portions 57 to outward side 31 of belt body 13. Web 55 is gathered into a series of open-ended flattened loops 59 with each loop looping slightly outwardly from outward side 31 of belt body 13 and defining a vertical through opening 61. Web 55 is preferably sewn along the lower edge of belt body 13 by intermittently spaced vertically extending seam means 63 passing respectively through web attachment portions 57, and the lower edge portions respectively of first "Velcro" element 51 and belt body 13 (see FIG. 6). Each of the assemblies 23a, 23b, 23c, 23d, and 23e is preferably in substantial alignment with a seam means 63.

Yoke reach portions 49a, 49b are adapted to be inserted upwardly through openings 61 of loops 59, and "Velcro" elements 51"a and 51"b are adapted to be matingly engaged with belt body-mounted "Velcro" element 51. Loops 59 bridgingly span reach portions 49a, 49b and prevent outward displacement of the reach portions from outward side 31 of the belt body along bottom edge 35 of the belt body; a pair of loops 59 of shackle means 53 bridgingly shackle yoke reach portions 49a, 49b against the lower outward side of belt body 13 and prevents outward displacement or peeling of the "Velcro" fastened reach portions away from the belt body.

Reinforcing means stay assemblies 23a, 23b, 23c, 23d, 23e preferably are uniformly intermittently spaced along the length of belt body 13 and respectively provide means for preventing buckling or wrinkling of the flexible belt body and such that would otherwise cause disengagement of "Velcro" fastened yoke reach portions 49a, 49b from belt body 13: Stay assemblies 23a, 23b, 23c, 23d, 23e each provide means for preventing the belt body from buckling near a "Velcro" fastened yoke reach portion and such as would cause the separation of the mating "Velcro" elements and disengagement of the yoke reach portions from the belt body. Each stay assembly 23a, 23b, 23c, 23d, 23e is alike and the following description of stay assembly 23a will suffice also as a description for stay assemblies 23b, 23c, 23d, 23e:

Stay assembly 23a includes a flat strip-like resiliently stiff stay member 65a preferably arranged in face to face engagement vertically on outward side 31 of belt body 13. A vertically arranged fabric strip 67a is laminatingly arranged over stay member 65a and defines pocket means for securing the stay member on belt body 13. Fabric strip 67a preferably is sewn on the belt body by a seam 69a extending continuously about the periphery of stay member 65a; the stay member is preferably interposedly secured between fabric strip 67a and the velvet-textured "Velcro" element 51 of yoke fastening means 51a, 51b.

Figure 4:
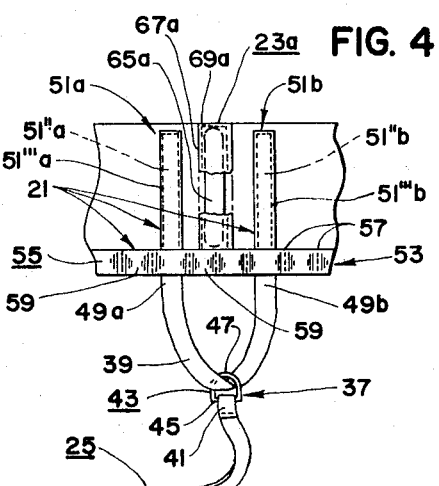
FIG. 4 is a view showing a yoke means of the invention engaged on the belt body (belt body fragmentarily shown) and with portions broken away for purposes of illustration.

Although yoke reach portions 49a, 49b may be arranged on the belt body at locations between an adjacent pair of reinforcing means (23a, 23b) and on that portion of the belt body which is not reinforced, a preferred way, or a preferred positioning of yoke reach portions 49a, 49b on the belt body is illustrated in FIG. 4: Preferably, reach portions 49a, 49b of yoke 19 are arranged on opposite sides of a reinforcing means (23a) as shown in FIG. 4. Such an arrangement permits a more secure attachment of yoke reach portions 49a, 49b than when the reach portions are secured on belt body portions which are not reinforced. Pair of bridle assemblies 17, 17' may be arranged in preferred positions on opposite, or left and right sides of the fastened belt body; the bridle assemblies may be readily shifted or positioned by disengaging and engaging the yoke member reach portions on desired portions of the belt body.

While I have shown and described a preferred embodiment of the present invention, it will be understood that various changes and modifications in structure may be made without departing from the spirit and scope of the invention as defined in the appended claims.

We claim:

1. Pelvic traction belt mean adapted for use with traction weight means and comprising a long, thin and wide flexible belt body adapted for encirclement about the waist waist of a supine patient, said belt body having inward and outward sides and top and bottom edges oriented respectively toward the head and foot of a patient, and including first fastening means detachably fastening together longitudinally distant portions of said belt body for supporting said belt body about the waist of the patient, bridle means adapted for tractive connection with the traction weight means, and second fastening means detachably fastening said bridle means to said belt body, said bridle means including at least one generally U-shaped flexible yoke having a bight portion and a pair of reach portions, and including at least one flexible traction strand having one end portion thereof adapted for tractive connection with traction weight means, said second fastening means including "Velcro"-type fastening means including first and second relatively operative contact surface elements arranged respectively on the outward side of said belt body and on a side of each reach portion of said pair of reach portions of said yoke, said yoke reach portions respectively being detachably engaged on said belt body by detachable engagement of said first and second contact surface elements of said "Velcro"-type fastening means; said second fastening means additionally including shackle means arranged generally along the lower edge of said belt body transversely loosely embracing respectively each reach portion of said pair of reach portions of said yoke means for preventing outward displacement of said reach portion from the outward side of said belt body.

2. The pelvic traction belt means of claim 1 wherein said shackle means includes a fabric web laminatingly secured at intermittently spaced attachment portions thereof to the outward side of said belt body and defining gather-like open-ended flattened loops with each loop looping outwardly from the outward side of said belt body and arranged between adjacent attachment portions of said fabric web, and with each loop of a pair of loops transversely spanning and loosely embracing respectively a reach portion of said pair of reach portions.

3. Pelvic traction belt mean adapted for use with traction weight means and comprising a long, thin and wide flexible belt body adapted for encirclement about the waist of a supine patient, said belt body having inward and outward sides and top and bottom edges oriented respectively toward the head and foot of a patient, and including first fastening means detachably fastening together longitudinally distant portions of said belt body for supporting said belt body about the waist of the patient, bridle means adapted for tractive connection with the traction weight means, and second fastening means detachably fastening said bridle means to said belt body, said bridle means including at least one generally U-shaped flexible yoke having a bight portion and a pair of reach portions, and including at least one flexible traction strand having one end portion thereof adapted for tractive connection with traction weight means, said second fastening means including "Velcro"-type fastening means including first and second relatively operative contact surface elements arranged respectively on the outward size of said belt body and on a side of each reach portion of said pair of reach portions of said yoke, said yoke reach portions respectively being detachably engaged on said belt body by detachable engagement of said first and second contact surface elements of said "Velcro"-type fastening means; said first fastening means detachably fastening together longitudinally distant portions of said belt body including "Velcro"-type fastening means including first and second relatively operative contact surface elements arranged respectively on the outward side of said belt body and on the inward side of said belt body adjacent one end of said body; the surface area of said first contact surface elements of said first and second fastening means being generally velvet-textured and formed substantially of micro-filament matted pile and the surface area of said second contact surface elements respectively of said first and second fastening means being generally bristle-textured and defined substantially of a multiplicity of short barbed bristles, and said first contact surface of said second fastening means being arranged over a major part of the outward side of said belt body, and said reinforcing means including a plurality of flat transversely extending strip-like stays arranged at intervals along the length of said belt body and supported on said belt body, and said shackle means including fabric web means extending along the lower edge and outward side of said belt body along a major portion of the full length of said body, said web means being laminatingly secured at intermittently spaced attachment portions thereof to the outward side of said belt body and over the velvet-textured first contact surface element of said "Velcro"-type fastening means, said web means being arranged in a series of gather-like loops, each loop of a selected pair of loops of said series of loops being adapted to transversely span and loosely embrace respectively a reach portion of said pair of reach portions of said yoke of said bridle means and with said reach portions respectively of said yoke having bristle-textured second contact surface elements and being detachably secured in correlative contacting arrangement with the velvet-textured first contact surface elements on said belt body.

References Cited

UNITED STATES PATENTS

| | | | |
|---|---|---|---|
| 3,021,838 | 2/1962 | Fine | 128—96 |
| 3,057,354 | 10/1962 | Roberts et al. | 128—289 |
| 3,063,718 | 11/1962 | Steinkamp | 273—55 |
| 3,176,684 | 4/1965 | Walsh | 128—75 |
| 3,452,747 | 7/1969 | Varco | 128—75 |

FOREIGN PATENTS

| | | | |
|---|---|---|---|
| 810,930 | 11/1967 | Canada | 128—75 |

OTHER REFERENCES

Richards Fracture & Orthopedic Supplies, p. 14.
De Puy Fracture Appliances, copyright 1964.

RICHARD A. GAUDET, Primary Examiner
J. YASKO, Assistant Examiner